UNITED STATES PATENT OFFICE 1,948,254

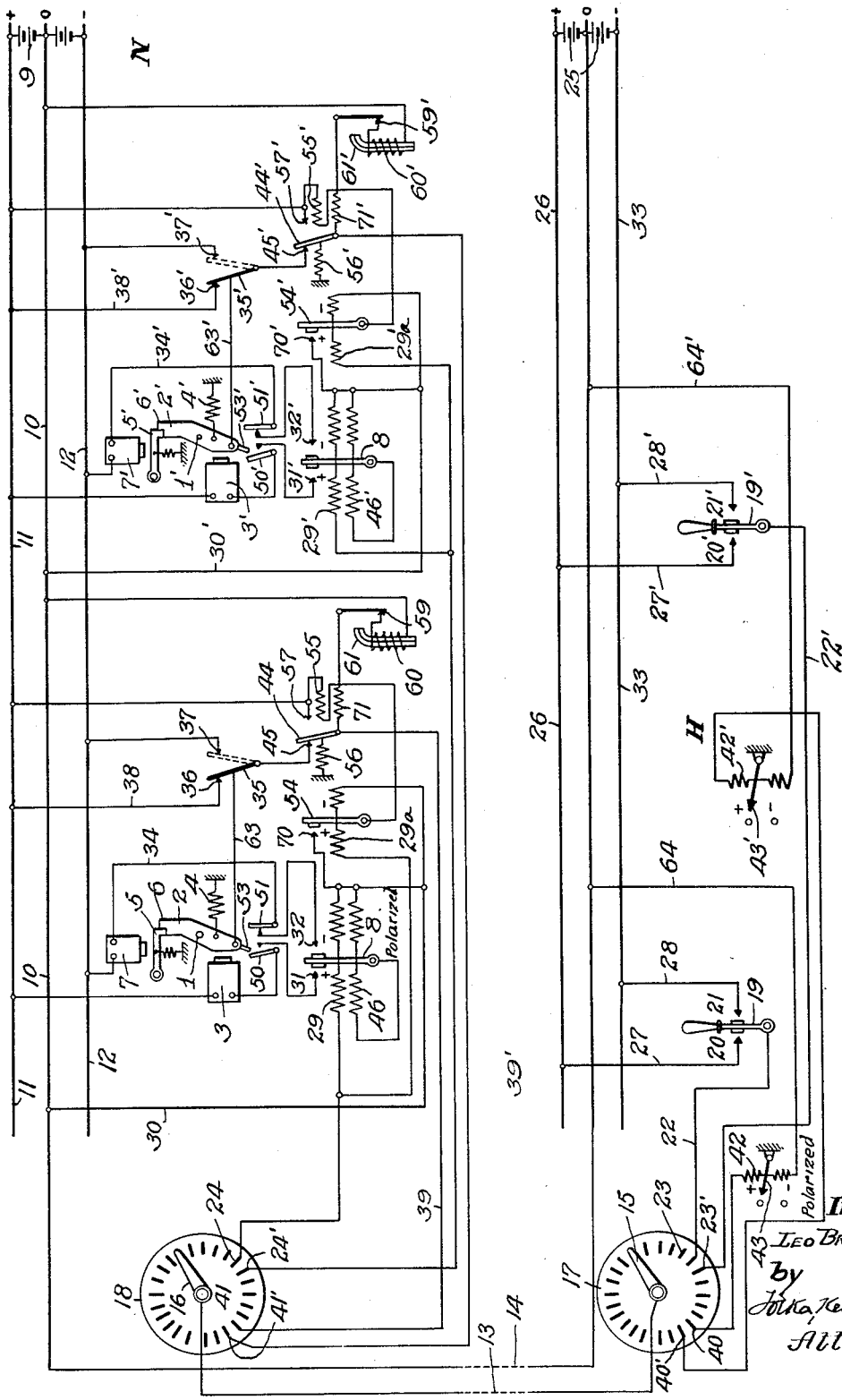

SWITCH POSITION INDICATOR

Leo Brandenburger, Berlin-Halensee, Germany, assignor to Siemens & Halske, Aktiengesellschaft, Siemensstadt, near Berlin, Germany, a corporation of Germany Application March 5, 1929, Serial No. 344,549, and in Germany March 10, 1928

2 Claims. (Cl. 177—311)

The control of an oil switch in a sub-station by means of a distant service apparatus from a main station is known. The distant service apparatus also transmits return indications to the main stations, giving the position of the switch at the moment. It may occur that there is a line closed from the main station to the oil switch in which there is a short circuit. In this case the excess current relay or any other line-protecting relay provided for this purpose, operates, and automatically opens the oil switch possibly before a return indication as to the closed position of the switch has reached the main station. In this case nothing further is known than that the oil switch has not answered the switching in direction. If the attendant in the main station maintains or repeats the impulse then the oil switch in the sub-station is repeatedly switched in and out. By this considerable risks are run. Even if the direction is not repeated, so that the oil switch in question remains switched off, the attendant at the main station is unaware whether the distance service apparatus has failed to act, or the oil switch gear has failed, or whether the line safety devices have operated in consequence of a failure in the line.

By means of the invention such defects are avoided by comparatively simple means. The invention is based on the recognition that it is of the first importance for the staff at the main station to know whether the distance service apparatus has transmitted the direction to the sub-station; when that is determined the attendants know that it is not necessary to any longer maintain that direction, and that in the case of the oil switch not having taken up the prescribed position, or not having retained it, faults must have occurred which will not be removed by the continued maintenance or repetition of the signal.

According to the invention the distance service apparatus is so arranged that a signal impulse not only causes in the sub-station the intended controlling movement, but also makes a connection which causes a return signal to the main station similar to the signal carried out; this connection remains upheld at least until the return signal has reached the main station. If the signal has been properly carried out in the sub-station then the return signal is simply received a little too soon. If on the other hand the intended control movement is not made at all, or if it is immediately reversed, then a second return signal passes to the main station as soon as the connection caused by the signal impulse has again been removed. The attendants are in this manner advised that the distant service apparatus has transmitted its signal, but that an impediment is opposed to the carrying out of the signal, which cannot be removed by the continued maintenance or repetition of the signal. As an example for the defects to be avoided the automatic release of an oil switch is given; the invention is of course also of value for many other controlling operations.

An example of the method of carrying out the invention is shown in the accompanying drawing. Movable organs are to be actuated from a main station H, they being situated in two sub-stations N. Both points are connected by lines 13 and 14. The line 13 connects the common point of two distributors which may be in the form of two contact arms 15 and 16 and two contact discs 17 and 18. The arms 15 and 16 pass over the contact discs 17 and 18 in such manner that they touch each time simultaneously two contacts correspondingly to each other. For this purpose any suitable apparatus is provided which insures the equal or synchronous movement of the two arms, but as such apparatus is well known, it has not been shown on the drawing.

Of the switching apparatus in the one sub-station N, only the control apparatus for an oil switch is shown as an example, on the spindle 1 of which the armature lever 2 is keyed. When the oil switch is to be actuated, a signal switch 19 is placed on one of its two contacts 20 and 21 in the main station H. The signal switch 19 is connected by means of a line 22 with the contact 23 of the disc 17. The corresponding contact on the disc 18 is indicated by 24. If for example the oil switch is to be brought into the connection position shown, the contact lever 19 is placed on the contact 20. A current then flows from the positive pole of the current source 25 through the lines 26 and 27, the contact 20, signal switch 19, line 22, contact 23, contact arm 15, line 13, contact arm 16, contact 24, through the winding 29 of a polarized relay and the lines 30 and 14 back to the zero point of the source of current 25. The winding 29 of the polarized relay thus receives a positive current impulse; consequently the contact tongue 8 of this relay is placed on its contact 31. The contact tongue 8 is connected through a second relay winding, the holding winding 46, with the neutral line 10 of a battery 9. The contact 31 is connected through a switch 50, shown in the open position, and an electromagnet 3, with the positive wire 11 of the battery 9.

When the oil switch is opened, the contact 50 is closed. Consequently as soon as the contact tongue 8 touches the contact 31, the holding winding 46 remains energized, even when the contact arms have again left the contact 23 and 24. The electromagnet 3 consequently becomes energized and draws the armature lever 2, against the pull of a spring 4, into the position shown. When the oil switch has reached the desired position, a nose piece 53 fixed on the armature lever 2 strikes against the switch 50 and opens it, so that the electromagnet 3 is deenergized, and the contact tongue 8 returns to the middle position. The oil switch, however, remains in its position as a second nose piece 6 on the armature lever 2 is held by a spur lever 5. If the oil switch is to be again switched out, then the signal switch 19 is switched over to its second contact 21 which is connected through the lines 28 and 33 with the negative pole of the current source 25. When the contact arms 15 and 16 again touch their contacts 23 and 24, the winding 29 of the polarized relay receives a negative current impulse. The contact tongue 8 is consequently placed on the contact 32 and held in this position by the holding winding now oppositely energized. From the contact 32 a line 34 leads through the switch 51 and the electromagnet 7 to the negative pole of the current source 9. The electromagnet 7 is energized and draws the pawl 5 out of its engaged position, so that the spring 4 draws back the armature lever 2 into its switching out position. When the lever has reached the switched out position, its nose piece 53 strikes against the switch 51. The latter is consequently opened and current cut off from the magnet 7 as well as from the holding winding 46.

With such distant service apparatus in which the arms 15 and 16 continuously rotate, the signal current impulses last only a short time, that is, only as long as the signal contacts 23 and 24 are in contact with the rotating arms. It is, however, important that the oil switch magnets 3 and 7 should be energized and remain energized until the required oil switch movement is completed. This is particularly important for the reason that in many cases the oil switches are not simply reversed by means of a magnet into their open and closed position, but an electric motor must run for a certain time in order to complete the oil switch movement. For this reason the holding winding 46 is arranged for retaining the relay tongue 8. As soon as the relay tongue touches one of its contacts 31 or 32, the holding winding 46 is energized and retains, as described, the relay tongue in the position taken up until the energizing current is again broken by the switches 50 or 51.

The apparatus for the return signalling of the position of the oil switch consists in the following:—An auxiliary switch 35 is connected with the armature lever 2 by means of a connecting bar 63. If the armature lever 2, as shown, is in the switched-in position, the switch 35 is on its contact 36, and in the switched-out position on a second contact 37. In the switched-in position shown in full lines the positive pole of the source of current 9 is connected through the lines 11 and 38, the contact 36, the auxiliary switch 35, a further switch 44, and the line 39 with a contact 41 of the contact disc 18. The contact 40 on the contact disc 17 corresponds to this contact. As soon as the two contact arms have reached these contacts, a connection is established through the two contact arms and the line 13 to an indicator coil 42, which controls an indicator apparatus 43 in the form of a polarized pointer. This shows the attendant whether the oil switch in the sub-station is in the switched-in or off position. The current flowing through the polarized relay 42, 43 is closed through the line 64 and the conductor 14. If the oil switch does not stand in the switched-in position but in the switched-off position, then the switch 35 is, as shown dotted, on a contact 37 which is in connection with the negative pole of the current source 9. The polarized relay 42, 43 thus receives a negative current impulse and adjusts the indicator apparatus 43 in that position which indicates the switched-out position.

According to the invention the return signalling device in the sub-station is to be capable of being so influenced by a signal current impulse that it gives a passing notification of the switched-in position of the oil switch no matter whether the oil switch remains in the switched-in position or is only momentarily in this position. For this purpose the switch lever 44 is under the influence of a winding 55. This is connected through a relay tongue 54 and the line 30 with the zero point of the source of current 9. The relay tongue 54 is under the influence of the polarized relay winding 29 and is actuated thereby in the same way as the relay tongue 8, in so far that it closes its contact 70, when the relay tongue 8 closes the contact 31. The relay tongue 54 is not under the influence of the holding winding 46 but only under the influence of the coil 29. This relationship is indicated in the drawing by the coil 29a connected in parallel with coil 29, so that the two coils are excited simultaneously and in the same direction. This mode of representation has been selected for the sake of easy reading of the drawing. As soon as a positive signal current impulse energizes the relay winding 29 through the contacts 23 and 24 the relay tongue 8 is moved into engagement with the contact 31 and the relay tongue 54 on the contact 70. Consequently the relay winding 55 also receives current and attracts the reversing switch 44 which places the return signal contact 41 on the positive pole of the current source 9. As soon therefore as the contact arms 15 and 16 have reached the return signal contacts 40 and 41 a positive current impulse passes over the winding 42 of the polarized indicating apparatus 43, which is consequently actuated and informs the attendant that the signal has arrived at the substation.

At the moment when the contact arms 15 and 16 have again left the signal contacts 23 and 24 the relay winding 29 has been deenergized and the contact 70 is consequently again broken. The reversing switch 44 however retains its position on the contact 57 still longer, as it is still under the influence of a second winding, namely, the holding current 71. The latter is energized through a heating coil 60, a contact 59, and the contact 57 at the moment in which this is closed by the reversing switch 44. By means of the heating coil 60 a bi-metallic rod 61 is heated and this opens the switch 59 after a certain period of lag. Only at this moment is the holding coil 71 again without current and the reversing switch 44 returns under the tension of the spring 56 back into the normal position shown. The period of retardation is so calculated that the contact 59 is not broken until the rotating contact arms 15 and 16 have reached the return signal contacts 40 and 41, so that the positive return signalling current running through the contact 57 displaces under all circumstances the polarized pointer 43. Only then does the reversing switch 44 return to the normal position shown.

Two cases may now arise. The oil switch and with it the armature lever 2 may take the desired fixed position and remain in this fixed position. In such case, the contact arms 15 and 16 on their next rotation again touch the return signal contacts 40 and 41, and the signal relay 42, 43 again receives a positive current impulse, this time not through the contact 57, but through the contacts 36 and 45; the signal disc however retains that position which indicates the switched-in position of the oil switch. It is however also possible either that the oil switch has remained stationary, perhaps because its spindle has burnt fast, or that it has reached the switched-in position but in consequence of an automatic release has immediately returned to the switched-out position. In this case, as soon as the contact arms 15 and 16 touch the return signal contacts 40 and 41 for the second time, the auxiliary contact 37 is closed and the reversing switch 44 is again in its normal position. The indicator relay 42, 43 consequently receives a negative current impulse and the attendant then notes that the signal has duly arrived but that it has either not been carried out or immediately reversed. Arrangements may also be made that in this case the indicator apparatus 43 only indicates the switched-out position if the attendant by means of a handle has acknowledged the notice of the signal respecting the presumed switched-in position. Apparatus serving this purpose form the subject matter of a separate application.

The return signal contact 41 may be directly connected with the auxiliary switch 35. The contact 45 is then connected with the negative pole of the current source and the auxiliary contact 37 with the reversing switch 44. The reversing switch 44 then, as soon as it is energized by the relay coil 55, switches over the contact 37 from the negative to the positive line of the current source 9. Such a connection is, for example, described in my United States Patent No. 1,805,999, but with the difference that the reversing is not caused by the polarized signal relay 29, but by a line protecting relay. The last mentioned connection between the auxiliary switch 35 and the reversing switch 45 may however in the case of oil switches which are apt to hang in an intermediate position, have the defect that in the case of such a suspension no return signal at all comes back into the main station, since then the auxiliary switch 35 remains in the middle position and closes neither the contact 36 nor the contact 37.

The second sub-station shown in the drawing includes mechanism corresponding to that of the first sub-station and operating in the same manner, while the main station includes an additional control mechanism, the parts being connected to the synchronizing means 17, 18. As the structure of the second sub-station is a duplicate of that of the first sub-station, and as the additional control mechanism corresponds to the first control mechanism, the corresponding parts in the second-sub-station and additional control mechanism have been designated with the same reference characters previously used in the description with the exception that a prime has been added thereto.

I claim:—

1. The combination of a sub-station having therein members each movable into two different positions, a main station from which said movable members are controlled, a signal line between the main and sub-stations, controlling devices at the main station corresponding to said movable members and each operative to send over said signal line an electrical controlling impulse for adjusting the position of the associated member, electromagnetically operated position indicating devices at said main station each operable to register the position of an associated member, return signalling devices in said sub-station controlled by said movable members and each operative through said signal line to actuate its associated indicating device in accordance with the position of the corresponding member, a distributor at the main station, a second distributor at the sub-station, said distributors being synchronously operated to connect selectively over said signal line the said controlling and indicating devices with their associated adjustable members and return signalling devices, means controlled by the control impulses and operative to cause each of the indicating devices to register the receipt of such impulses independently of the carrying out thereof, and mechanism for rendering said last-mentioned means inoperative upon operation of the indicating device thereby.

2. The combination of a sub-station having therein members each movable into two different positions, a main station from which said movable members are controlled, a signal line between the main and sub-stations, controlling devices at the main station corresponding to said movable members and each operative to send over said signal line an electrical controlling impulse for adjusting the position of the associated member, electromagnetically operated position indicating devices at said main station each operable to register the position of an associated member, return signalling devices in said sub-station controlled by said movable members and each operative through said signal line to actuate its associated indicating device in accordance with the position of the corresponding member, a distributor at the main station, a second distributor at the sub-station, said distributors being synchronously operated to connect selectively over said signal line the said controlling and indicating devices with their associated movable members and return signalling devices, means controlled by the control impulses and operative to cause each of the indicating devices to register the receipt of such impulses independently of the carrying out thereof, said return signalling devices and said last-mentioned means comprising, for each movable member, two auxiliary contacts controlled by said adjustable member, one of said contacts connecting said signal line in one position of said member, with the positive pole of a source of current, and the other of said contacts connecting said signal line, in another position of said member, with the negative pole of such source of current, a return signal conductor between said contacts and signal line, a reversing switch between said return signal conductor and said contacts, mechanism controlled by a control impulse reaching the sub-station for actuating said reversing switch to switch the return signal conductor from said contacts and connect such line with a pole of the source of current, and a time relay operative to hold said reversing switch in such position until the return signal has reached the main station.

LEO BRANDENBURGER.